United States Patent
Kraus

(10) Patent No.: US 10,343,518 B2
(45) Date of Patent: Jul. 9, 2019

(54) WORK IMPLEMENT PTO SUPPORT ASSEMBLY

(71) Applicant: Deere & Company, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 136 days.

(21) Appl. No.: 15/414,774

(22) Filed: Jan. 25, 2017

(65) Prior Publication Data

US 2018/0208056 A1 Jul. 26, 2018

(51) Int. Cl.
*A01B 71/06* (2006.01)
*B60K 17/28* (2006.01)

(52) U.S. Cl.
CPC .............. *B60K 17/28* (2013.01); *A01B 71/06* (2013.01)

(58) Field of Classification Search
CPC ................................. A01B 71/06; B60K 17/28
See application file for complete search history.

(56) References Cited

U.S. PATENT DOCUMENTS

| | | | | |
|---|---|---|---|---|
| 2,869,660 | A | * | 1/1959 | Krause ................... B60D 7/00 180/14.4 |
| 3,007,535 | A | | 11/1961 | Lippke |
| 4,020,913 | A | | 5/1977 | Yatcilla |
| 4,071,105 | A | * | 1/1978 | von Allworden ...... A01B 71/06 172/272 |
| 4,184,558 | A | | 1/1980 | de Buhr et al. |
| 4,588,323 | A | * | 5/1986 | Vollmer ................ A01B 71/06 403/12 |
| 6,015,016 | A | | 1/2000 | Anderson |
| 7,862,068 | B2 | | 1/2011 | Schlesser et al. |
| 7,980,338 | B2 | | 7/2011 | Steffensen et al. |
| 9,615,502 | B1 | | 4/2017 | Smith |
| 2009/0057516 | A1 | | 3/2009 | Schlesser |
| 2010/0327144 | A1 | | 12/2010 | Steffensen |

FOREIGN PATENT DOCUMENTS

EP 1 982 580 A2 10/2008

OTHER PUBLICATIONS

European Search Report issued for EP 18 15 2914 dated Jun. 14, 2018, 10 pages.
Woods Equipment Company, "Batwing" product brochure, Copyright 2017.
Woods Equipment Company, "Best Batwing Ever," YouTube video, https://www.youtube.com/watch?v=yBMj1HmD7BI published Aug. 25, 2017.
John Deere, Balers—9 Series Round Balers • Small Square Balers • 900 Series Round Balers, Apr. 2016.

* cited by examiner

*Primary Examiner* — Joseph M Rocca
*Assistant Examiner* — Michael R Stabley
(74) *Attorney, Agent, or Firm* — Klintworth & Rozenblat IP LLP

(57) ABSTRACT

A PTO support assembly for a work vehicle train includes a work vehicle having a PTO drive shaft and a work implement, towed by the work vehicle, having a PTO shaft. The PTO support assembly has a mounting base with a connection interface coupled to the work implement. A support member is coupled to the mounting base and has a support interface for contacting the PTO shaft. The PTO support is adjustable to a support position in which the support interface is maintained at a height corresponding to a height at which the PTO shaft is engaged with the PTO drive shaft.

18 Claims, 5 Drawing Sheets

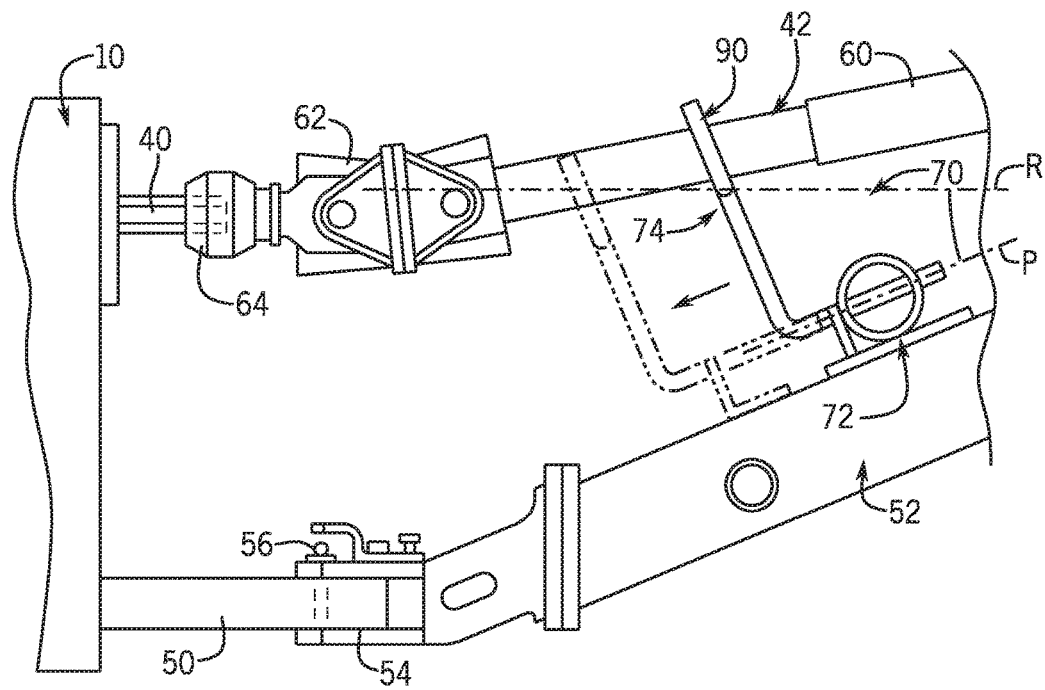
FIG. 6
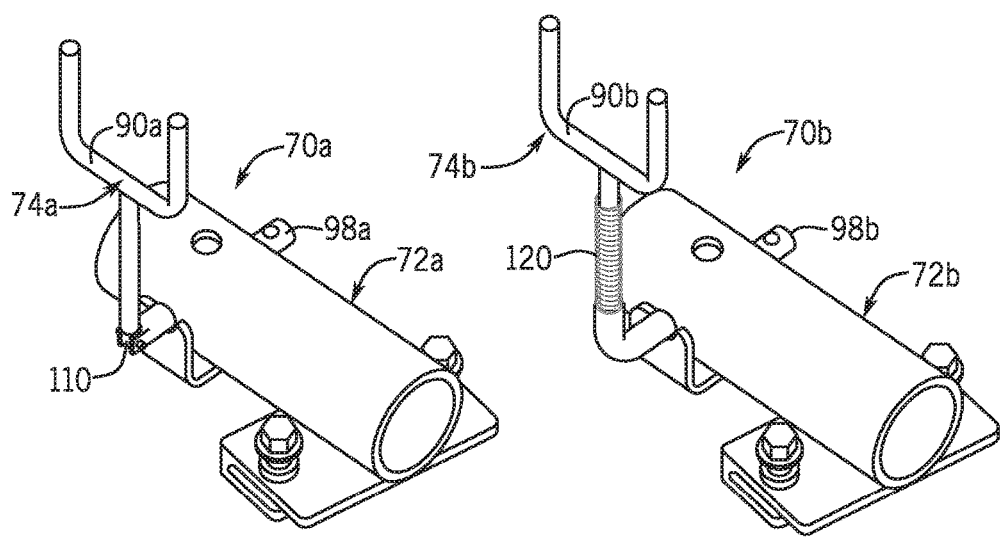
FIG. 7
FIG. 8

WORK IMPLEMENT PTO SUPPORT ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to power take off ("PTO") arrangements of work implements, and particularly to support assemblies on which PTO shafts may rest when decoupled from PTO drives.

BACKGROUND OF THE DISCLOSURE

Various work vehicle trains include a towing vehicle and a towed implement. In the agriculture industry, for example, a work vehicle train may include a tractor towing a baler or mower implement that is hitched to a rear of the tractor. Often, the work vehicle is responsible for supplying power to movable components (e.g., pumps, rollers, cutters, etc.) of the work implement it is towing, in which case a PTO arrangement may be provided to facilitate power transfer. Such PTO arrangements may include a drive shaft at the rear of the vehicle (e.g., a splined stub shaft) and an adjustable PTO shaft (e.g., including a telescoping coupler and CV joint) mounted to the work implement that engages the drive shaft and transmits rotational power to the driven components of the work implement.

An adjustable connection to the work implement allows the PTO shaft to be positioned as needed to couple to drive shafts located at different positions (e.g., at different heights or vertical distances from the hitch, which may vary for different work vehicles). Because of this movability, when a PTO shaft is decoupled from a drive shaft, the PTO shaft will not maintain its coupled position. Various supports have been devised on which an operator may rest PTO shafts after they have been decoupled. However, PTO shafts in work applications such as mentioned may be heavy, soiled (e.g., greasy) or both, thus making conventional PTO support arrangements that require operator positioning of decoupled PTO shafts disadvantageous in certain respects.

SUMMARY OF THE DISCLOSURE

The disclosure provides an adjustable PTO support assembly that, among other things, may be set at a height supporting the PTO shaft in its PTO drive coupled position.

One aspect the disclosure provides a work implement PTO support assembly. The PTO support assembly includes a mounting base having an adjustable connection interface configured to adjustably couple to the work implement. The PTO support assembly also includes a support member coupled to the mounting base and having a support interface for contacting a PTO shaft of the work implement when in one of a plurality of support positions. When the support member is in one of the plurality of support positions, the mounting base and the support member are configured to maintain the support interface at an associated one of a plurality of heights.

Another aspect the disclosure provides a PTO support assembly for a work vehicle train including a work vehicle having a PTO drive shaft and a work implement towed by the work vehicle and having a PTO shaft. The PTO support assembly includes a mounting base having a connection interface coupled to the work implement, and includes a support member coupled to the mounting base and having a support interface for contacting the PTO shaft. The PTO support is adjustable to a support position in which the support interface is maintained at a height at which the PTO shaft is engaged with the PTO drive shaft.

The details of one or more embodiments are set forth in the accompanying drawings and the description below. Other features and advantages will become apparent from the description, the drawings, and the claims.

BRIEF DESCRIPTION OF THE DRAWINGS

FIG. 6 is a partial side view of the example work vehicle train showing the example PTO support being stored from the support orientation, as shown in FIG. 5C;

FIG. 7 is a perspective view similar to FIG. 4A showing another example PTO support in which the support member is hinged; and FIG. 8 is a perspective view similar to FIG. 7 showing another example PTO support in which the support member includes a spring coupler.

Like reference symbols in the various drawings indicate like elements.

DETAILED DESCRIPTION

Figure 1:
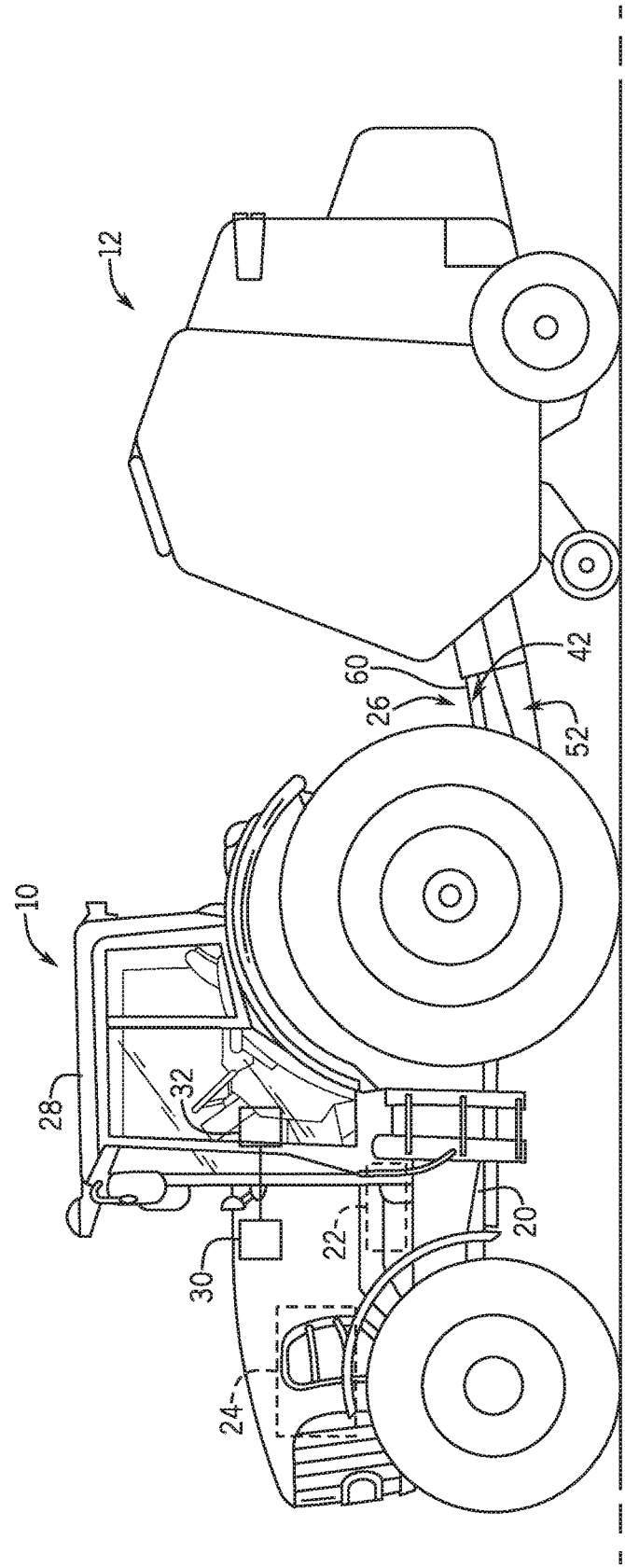
FIG. 1 is side elevational view of a work vehicle train in the form of an agricultural tractor and a round baler in which a PTO support assembly according to this disclosure may be incorporated.

The following describes one or more example embodiments of the disclosed PTO support arrangement, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Furthermore, in detailing the disclosure, terms of direction and orientation, such as "forward," "aft," "lateral," "horizontal," and "vertical" may be used. Such terms are defined, at least in part, with respect to the direction in which the work vehicle travels during use or with respect to a geospatial reference system. Further, the discussion below may reference a cylindrical coordinate system with "axial," "radial," and "circumferential" orientations relative to a longitudinal axis.

As noted, for various reasons it may be desirable for a work vehicle to provide power to an associated implement, such as an implement towed or pushed by the work vehicle, using a power take-off (PTO) arrangement to transfer power from an input shaft coupled to the power system of the work vehicle to an output shaft that, in turn, transfers power to the implement. Conventional PTO arrangements may take various forms that allow for adjustment with respect to the work vehicle and the work implement. For example, the reach of the PTO may be adjusted by a telescoping PTO shaft and the extension angle, and thereby the vertical height, may be adjusted by a pivotal connection with the work implement or by a swivel connection that also permits sidewise or lateral adjustment of the PTO orientation.

Adjustment of the PTO may be useful for various reasons including to allow for movement in response to movement of the work vehicle and/or the work implement during operation or transport. As one example, the PTO may be required to elongate or shorten, and also pivot laterally and/or vertically, as the work vehicle train traverses uneven terrain (e.g., an inclined slope) or corners in order to maintain power coupling with the PTO drive shaft of the work vehicle. As another example, the PTO may require repositioning in order to establish the initial power coupling with the PTO drive shaft. Work vehicles come in various types (e.g., tractors, mowers, loaders, and so on) and even work vehicles of the same type come in different sizes and have PTO drives at different locations (e.g., heights) compared to other work vehicles. PTO shafts may also require adjustment in order to move the PTO shaft clear of the drive shaft after decoupling or to set the PTO shaft on a dedicated PTO support. In the latter case, the PTO supports may be mounted to the work implement to support the PTO shaft off to a lateral side of the implement.

Further, while conventional PTO shafts may provide position adjustment, they may exhibit considerable weight (e.g., 50 pounds or more) and have features that have become soiled from use or which contain a lubricant (e.g., grease). Handling PTO shafts in order to adjust the PTO as needed to establish coupling or to reposition the PTO shaft after decoupling thus may be somewhat cumbersome and messy.

This disclosure addresses one or more of the aforementioned issues by providing a PTO support that is mountable to the work implement and configured to support the PTO shaft (or coupling members thereof) in the orientation required to establish and maintain power coupling with the PTO drive shaft of the work vehicle. The PTO support may have an adjustable mounting connection to the work implement to permit the PTO support to be moved to the position at which it supports the PTO shaft in its coupled position. Further, the PTO support may be adjusted or moved from its supporting orientation or position to a storage orientation or position. In some cases, the PTO support can be moved from supporting to storage states, and back, without requiring the PTO shaft to be repositioned.

In certain embodiments, the PTO support has an adjustable connection to the work implement facilitating quick and accurate height adjustment of the PTO support into a coupled shaft support position. A sliding clamp connection may couple to a rail, flange other linear feature of the work implement to allow for vertical repositioning of the PTO support while the PTO shaft is coupled to the PTO drive shaft. In one embodiment, the PTO support has a mounting base with a channel and an adjustable fastener. The base channel slidably receives a flange (e.g., a flange of a channel member) of the work implement hitch tongue brace or frame and may be clamped at various positions position along the tongue by the fasteners. Depending on the configuration and orientation of the hitch tongue, such as a generally fore-aft inclined or declined orientation, repositioning the PTO support may provide height adjustment as well as fore-aft and/or lateral adjustment. Generally, laterally inclined/declined movement may provide height adjustments in certain configurations of the PTO support and the work implement hitch tongue.

In certain embodiments, the PTO support has a support member that is generally upright in its support orientation and movable with respect to the mounting base. The support member may include or be coupled by a spring device (e.g., a spring coupler) to accommodate movement of the PTO shaft, such as movement of the PTO shaft during operation or transport in the event that the PTO support is left in its support position during use. The support member may instead include or be attached to the mounting base by a hinge mechanism, which will accommodate PTO shaft movement similar to a spring, or to establish movement of the PTO support into either the support or storage orientations. In one example embodiment, the support member is removable from the mounting base such that the support member connects to the base in one orientation when supporting the PTO shaft and in a different orientation when stored. In this embodiment (and other embodiments), storing the support member causes the support member to move in a direction away from PTO shaft so as to allow storage without binding against, or requiring repositioning of, the PTO shaft (i.e., without requiring the PTO shaft to be displaced from the coupled position).

In certain embodiments, the PTO support may provide for lateral shifting of the PTO shaft by having a support member with a supporting feature that is longer in the lateral dimension (i.e., wider) than the PTO shaft. The support member may have upright ends at lateral ends of the supporting feature to constrain movement (e.g., excessive lateral shifting) of the PTO shaft and inhibit its dislodging from the PTO support.

In still other embodiments, the PTO support may be made of low-cost construction, using various plate, bar, rod and/or tube stock materials. For example, the mounting base may include a cylindrical tube with bored openings that receive a support member made of bar stock. Such a bar stock support member may have a "goal post" or forked shape with an elongated, possibly bent distal end, and a U-shaped upper end where the PTO shaft rests between the upright ends.

Referring now to FIG. 1 of the drawings, the disclosed PTO support may be used in an arrangement in which work vehicle 10, shown as an agricultural tractor, utilizes an accessory component or implement 12, shown as an agricultural round baler. Generally, the example PTO supports described herein are applicable to any type of work vehicle and/or implement with a PTO arrangement for power coupling. Examples of work vehicles include various other tractors, trucks, loaders, and the like. Examples of work implements include other balers, mowers, conditioners, and the like. Such work vehicles and implements may be used in the agricultural, construction, forestry, mining or other industries. Moreover, the disclosed PTO support may be utilized with non-mobile applications in which the power-supplying machine is stationary and other than a vehicle.

As shown, the work vehicle 10 may be considered to include a main frame or chassis 20, a propulsion drive assembly 22, a power system 24, a power take-off (PTO) arrangement 26, and an operator platform or cabin 28. The power system 24 may include a power source (e.g., an internal combustion engine, a fuel cell, an electric motor, and/or a hybrid-gas electric motor) used for propulsion of the work vehicle 10 via the propulsion drive assembly 22, as well as to power various electric and hydraulic sub-systems of the work vehicle 10, including those used to provide various auxiliary functions described herein.

In this example, the work vehicle 10 further includes one or more controllers, such as controller 30, and control inputs, such as operator interface 32. As is typical, the cabin 28 is mounted to the chassis 20 and houses the operator that controls operation of the work vehicle 10 via the various operator controls, including via the operator interface 32. The controller 30 has one or more control elements to control various aspects of the operation of the work vehicle 10 and/or implement 12. The controller 30 may be configured as one or more computing devices with associated processor devices and memory architectures, as a hard-wired computing circuit (or circuits), as a programmable circuit, as a hydraulic, electrical or electro-hydraulic controller, or otherwise, so as to be configured to execute various computational and control functionality. As such, during operation the operator interface 32 communicates with the controller 30 to implement various control selections. As examples, the controller 30 may generate appropriate commands to the power system 24 and one or more components of the PTO arrangement 26 (e.g., clutch, brake or shift devices) to provide the appropriate drive output to the work implement 12.

The PTO arrangement 26 is configured to transfer power between the power system 24 of the work vehicle 10 and power-consuming components (not shown) of the work implement 12 (e.g., various pumps, rollers, tiers, netters, and the like). Generally, the PTO arrangement 26 either includes a dedicated PTO transmission or couples to the vehicle transmission (not shown). In either case, the transmission is rotationally coupled to the power system 24 (e.g., via an engine drive shaft), and directly or indirectly to a PTO drive shaft 40 by a gear set (not shown) of the transmission such that power may be transferred to the PTO drive shaft 40 at a specified fixed or variable gear ratio, and corresponding fixed or variable speed and torque. The power-consuming components of the work implement 12 are drivingly connected to the PTO drive shaft 40 via a PTO shaft 42 to receive and utilize this power. The power-consuming components of the work implement 12 may operate at the speed and torque of the PTO drive shaft 40, or by using further gearing, at a reduced or increased speed or torque. Moreover, the PTO arrangement 26 may include a clutch (not shown) to engage and disengage the drive connection between the input shaft and the PTO drive shaft 40, and a brake device (not shown) to prevent rotation during certain situations. In certain cases, the PTO arrangement 26 may enable power transfer between the work vehicle 10 and implement 12 according to various operational modes, such a relatively high speed (low torque) mode, a relatively low speed (high torque) mode, and a powered neutral mode in which the PTO shaft 42 is decoupled from the input shaft and any other components of the PTO arrangement 26 that may otherwise cause resistance to implement manipulation at the PTO drive shaft 40, such as to enable manual manipulation of the work implement 12 (e.g., moving various features of the work implement 12) without turning off the work vehicle 10.

The work implement 12 may be coupled to the work implement 10 in any of various known ways. For example, various known drawbar and hitch connections or three-point hitch connections may be used. Also, various components and techniques for coupling and adjusting the position of the PTO shaft 42 with respect to the PTO drive shaft 40 may be used. For example, the PTO drive shaft 40 and the PTO shaft 42 may be directly connected to one another or various couplers or multi-position joints may be used. Similarly, various direct or indirect connections of the PTO shaft 42 to the work implement may be employed. The PTO support disclosed herein is generally useful for a wide variety, if not all, commercially available PTO arrangements. The disclosed PTO support may even be used with a PTO arrangement having a fixed position PTO shaft.

Figure 2:
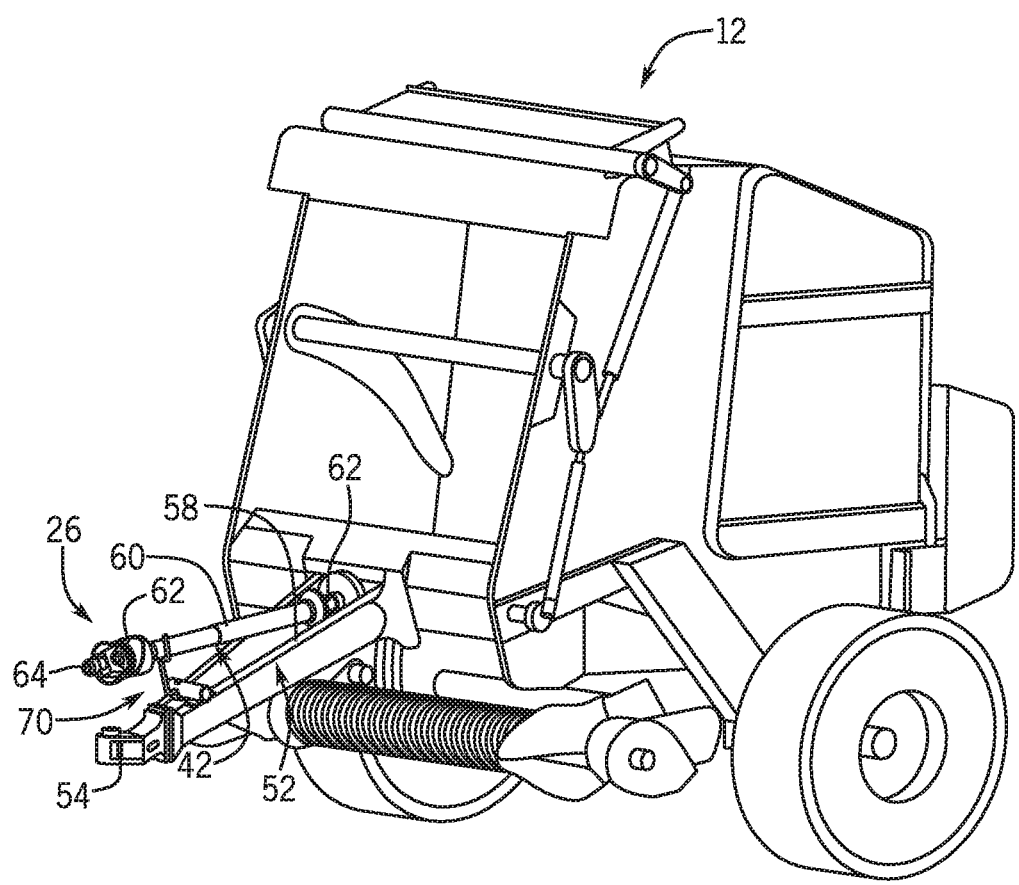
FIG. 2 is a perspective view of the example round baler of the work vehicle train in FIG. 1.

Referring also to FIGS. 2 and 6, an example PTO arrangement 26 for the example work vehicle train shown of FIG. 1 is shown. In the illustrated example, the work vehicle 10 has a drawbar 50 extending rearward toward the work implement 12. The drawbar 50 may mount a hitch coupler, or simply include an opening, as in the illustrated example. The work implement 12 has a forwardly extending tongue 52 that includes or mounts a hitch device 54. The hitch device 54 may couple to the drawbar 50 in any conventional manner, including via a hitch pin 56 that is received in the drawbar opening. When connected, the long axis of the hitch pin 56 is generally in a vertical or upright orientation, which provides for laterally pivotal movement (about the vertical/upright axis of the hitch pin 56) of the work implement 12 with respect to the work vehicle 10. In the illustrated example, the tongue 52 declines as it extends forward toward the work vehicle 10 such that the hitch device 54 is vertically lower than the connection of the tongue 52 to the work implement 12. The tongue 52 itself may be a pair of structural braces or frame members, each of which may be of channel (e.g., C, I, etc.) or other construction. In any case, the braces will provide one or more flat, in this case upper, fore-aft inclining, surfaces. The flat upper surfaces in the illustrated example are defined by a short leg or flange 58 of the C-channel member forming each brace of the tongue 52. The braces in the illustrated example are arranged so that the C-channels open toward the fore-aft centerline of the work vehicle train, such that the flanges 58 extend toward the centerline and one another to their terminal ends.

As noted, like the physical coupling of the machines, the power coupling of the machines may be made in various ways. In the illustrated example, the PTO drive shaft 40 is an axially splined stub shaft that is operatively coupled to the work vehicle 10 to transmit rotational power and arranged to extend rearward toward the work implement 12. The example PTO shaft 42 interfaces with the PTO drive shaft 40 through a coupler 60, which in this case is a telescoping member with a multi-axis universal (or constant velocity) joint 62 at each end, that is, at the end that couples to the work implement 12 and the end that couples to the PTO drive shaft 40 of the work vehicle 10. The telescoping coupler allows for variations in the linear reach of the PTO shaft 42 in the fore-aft dimension and the universal joints 62 allow for pivotal movement in the lateral and vertical planes. This adjustment accommodates variations in the vertical, lateral and fore-aft position of the PTO drive shaft 40 that may arise when the work implement 12 is coupled to work vehicles of different sizes or types as well as to accommodate for relative movements, especially in the pitch and roll directions, of the work implement 12 as it is towed by the work implement 10. A splined socket 64 connected to the forward universal joint 62 interfaces with the PTO drive shaft 40 to transmit rotational power to the PTO shaft 42. As noted, it is also possible in some situations for the PTO shaft to connect directly to the PTO drive shaft, in which case relative spatial accommodations may be made by other means. It should be noted that for purposes of this disclosure the telescoping coupler 60 is considered to be a part of the PTO shaft 42, such that they may be considered one and the same component.

Figure 4A:
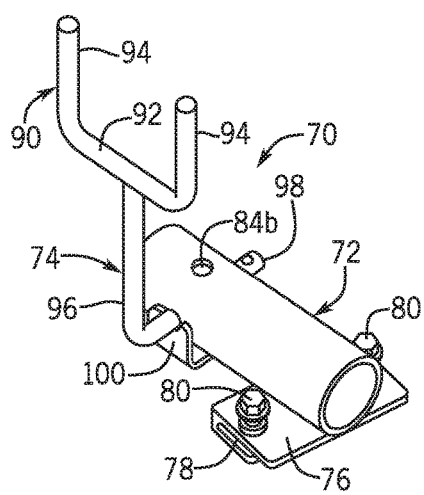
FIGS. 4A and 4B are perspective views of the example PTO support in the respective support and storage orientations.
Figure 4B:
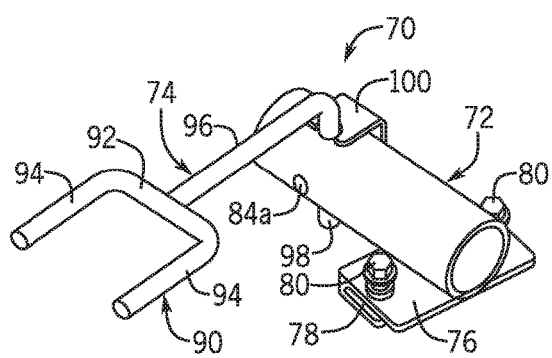

Referring also to FIGS. 4A and 4B, one example configuration of a PTO support according to this disclosure will now be detailed. As shown, an example PTO support 70 includes as primary features a mounting base 72 and a support member 74. The features in the illustrated example are configured for economic construction using common stock materials, including various plate, bar, rod and tube stock. It will be understood, however, that various other constructions may serve construction of the disclosed PTO support.

The mounting base 72 of the example PTO support 70 has a channel bracket 76 providing an adjustable clamping connecting interface to the work implement 12. Specifically, the channel bracket 76 includes upper and lower plate extensions (the upper plate being sized slightly larger than the lower plate) defining a channel 78 that opens on three sides. The channel bracket 76 also has two tapped openings in which threaded fasteners 80 are threaded. Various washers or spacers may be disposed between the upper plate and the head of the fasteners. The mounting base 72 also includes a main body 82 (e.g., a pipe or other tubular member) that is connected (e.g., by welding) to the upper plate of the channel bracket 76. The main body 82 includes two through openings 84a, 84b (i.e., two sets of aligned openings). The openings 84a are angularly offset from the openings 84b, being approximately orthogonal in the illustrated example. However, the relative and absolute angular orientations may vary in other embodiments and applications, for example, when mounting to a work implement having a tongue that extends at a different draft angle, as explained in more detail below. Also, it can be seen from the figures that in the illustrated example the main body 82 is situated such that its long axis extends at an oblique angle relative to the long dimension of the channel bracket 76. This too may vary depending on the embodiment and application, for example, when mounting to a work implement having a different bracing arrangement for the tongue (e.g., different lateral angulation of the braces). As in the illustrated example, the orientation of the main body 82 with respect to channel bracket 76 may be set such that it will extend generally in the lateral dimension (perpendicular to the fore-aft direction of travel) when the PTO support 70 is mounted to the work implement 12.

The other primary feature of the example PTO support 70, the support member 74, provides the support interface for the PTO shaft 42, which, as noted above, is considered here to include the coupler 60. The example support member 74 has a forked or "goal post" configuration, including an upper U-shaped section 90 having a cross-piece 92 and upright lateral ends 94, and an elongated, post 96 having a bent distal end 98. It should be noted that reference herein to "upright" features or aspects of the PTO support pertains to a generally vertical geospatial orientation of the features or aspects when the PTO support is in a supporting orientation or position. Such features or aspects may not present a vertical orientation in a geospatial reference system when in other orientations or positions (e.g., a storage orientation or position). In the illustrated example, the support member 74 has a solid-core rod assembly construction in which the U-shaped section 90 is a single bent rod, which is assembled (e.g., by welding) to the bent rod post 96. The support member 74, or at least the distal end 98, is of a diameter and length sized to fit within and through the openings 84a, 84b of the main body 82 of the mounting base 72. Additionally, an anti-rotation member 100, in the form of an L-bracket in the illustrated example, may be connected (e.g., by welding) to the support member 74, and the distal end 98 specifically, in order to prevent relative rotation of the support member 74 and the main body 82 (about a pin axis P of the distal end 98) by contacting interference of the anti-rotation member 100 with the main body 82. Anti-rotation members having different configurations (e.g., clips, detents, and so on) may be used instead of the bracket shown.

Figure 3A:
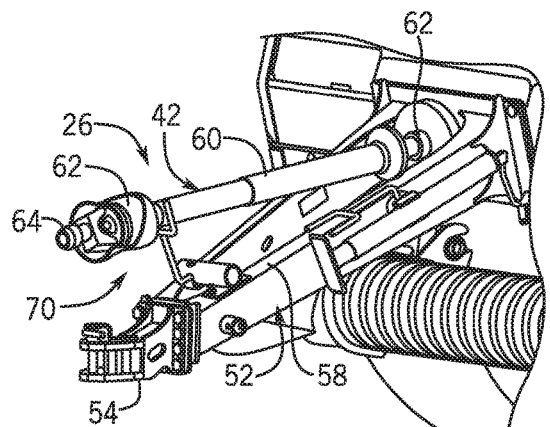
FIGS. 3A and 3B are partial perspective views of the example round baler showing the example PTO support in respective support and storage orientations.

FIGS. 3A and 4A depict the example PTO support 70 in its support orientation in which the distal end 98 of the support member 74 is connected to the main body 82 of the mounting base 72 via openings 84a. As shown in FIG. 3A, when mounted to the work implement 12, the support member 74 takes an upright, although not truly vertical, posture. In any event, the PTO support 70 may be mounted to the work implement 12 so that when in its support orientation, the cross-piece 92 of the support member 74 is positioned directly underneath the PTO shaft 42 (specifically the telescoping coupler 60 portion thereof) so as to directly contact and support the PTO shaft 42. In this position, the upright lateral ends 94 of the support member 74 constrain or capture the PTO shaft 42 laterally and inhibit lateral separation of the PTO shaft 42 from the PTO support 70.

Moreover, the PTO support 70 may be positioned so that when in the support orientation it supports the PTO shaft 42 in the orientation needed to couple to the PTO drive shaft 40. Thus, the PTO support 70 may directly support the PTO shaft 42 without requiring the PTO shaft 42 to be repositioned subsequent to being decoupled from the PTO drive shaft 40. With the PTO support 70 disclosed herein, the PTO support 70 may be set to its support orientation while the PTO shaft 42 is coupled to the PTO drive shaft 40. The work vehicle 10 may be unhitched from the work implement 12, which may be decoupled from power by pulling the work vehicle 10 away from the work implement 12 to disconnect the splined coupling. Then, when then work implement 12 is to be reconnected again, the PTO shaft 42 is already in the power-coupling position. An operator may establish hitching and power-coupling simultaneously, and without the need to lift, or otherwise reposition the PTO shaft 42.

Figure 3B:
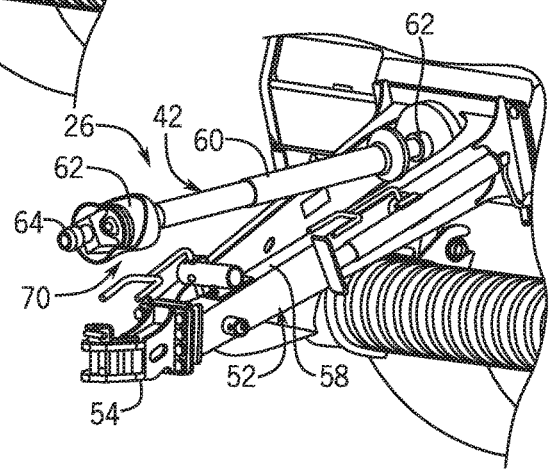

When the PTO shaft 42 is coupled to the PTO drive shaft 40, the PTO drive shaft 40 is able to support the weight of the PTO shaft 42. For this reason, and to accommodate relative movement of the PTO shaft 42 during operation or transport of the work implement 12, the PTO support 70 may assume a storage orientation or position. In the illustrated example, the PTO support 70 is converted to its support orientation shown in FIGS. 3B and 4B by removing the support member 74 from the mounting base 72 and orienting it so that the distal end 98 fits down into the openings 84b of the main body 82. The support member 74 thus takes a generally horizontal posture that is out of the way of the PTO shaft 42 so as not to impede its movement. In other configurations, such as described below, the PTO support may be converted to a storage posture in other ways.

The disclosed PTO support facilitates PTO shaft supporting while minimizing or avoiding lifting or other repositioning of the PTO shaft in at least two other aspects. First, as noted, the PTO support may be moved into support and storage orientations without disrupting (i.e., moving) the PTO shaft. Second, the PTO support may be adjustably mounted to the work implement 12 to facilitate setting or changing the support height of the PTO support. With regard to the former aspect, and continuing in the context of the illustrated example, PTO support 70 is configured so that the support member 74 is separated from the mounting base 72 in a manner such that the support member 74 moves away from the PTO shaft 42 for storage, and further that it follows a non-interfering path toward the PTO shaft 42 when converting to the support orientation.

Referring again to FIG. 6, the angular orientation of the openings 84a is set so that the distal end 98 of the support member 74 is generally aligned along an axis or within a lateral plane that forms at least a minimum angle with an axis or lateral plane that intersects the support interface (e.g., a horizontal reference plane R intersecting the cross-piece 92 of the support member 74). In the illustrated example, the included angle is approximately 25 degrees with respect to reference plane R (and approximately 15 degrees with respect to the axis of the PTO shaft 42). In various embodiments and applications, however, the included angle may be any angle of about 10 degrees or more. As illustrated in FIG. 6, as the support member 74 is separated from the mounting base 72 it follows a trajectory moving (down and to the left in FIG. 6) away from the PTO shaft 42. Reversing the process to move the support member 74 into its support orientation thus follows the reverse trajectory (up and to the right in FIG. 6). The PTO support 70 may thus be moved into either support or storage orientation without binding against or moving the PTO shaft 42. In some embodiments and applications, the upper section of the PTO support 70 may be configured to allow for such movement without interfering with certain adjoining components. For example, the upper "U" section of the support member may be widened (i.e., of a greater lateral dimension) in order to avoid interfering contact with a larger end joint. In other cases, such movement may be possible when the PTO support is mounted within a range of distances along or with respect to the PTO shaft (e.g., beyond a minimum clearance distance from the end joint).

Figure 5A:
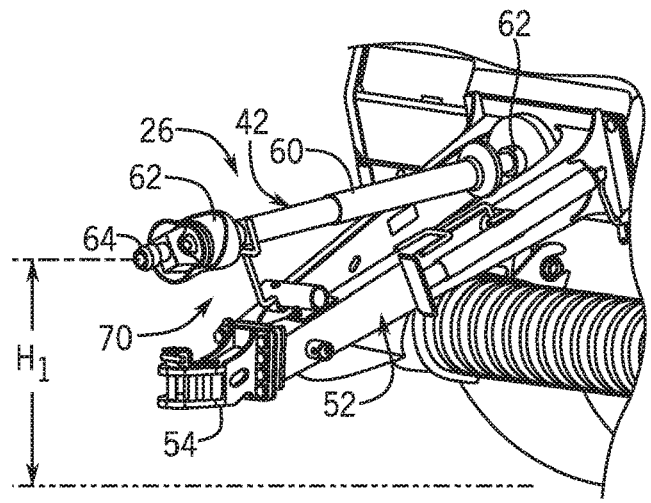
FIGS. 5A-5C are partial perspective views similar to FIG. 3A showing the example PTO support mounted in support orientations at various height and fore-aft positions on the example round baler.
Figure 5B:
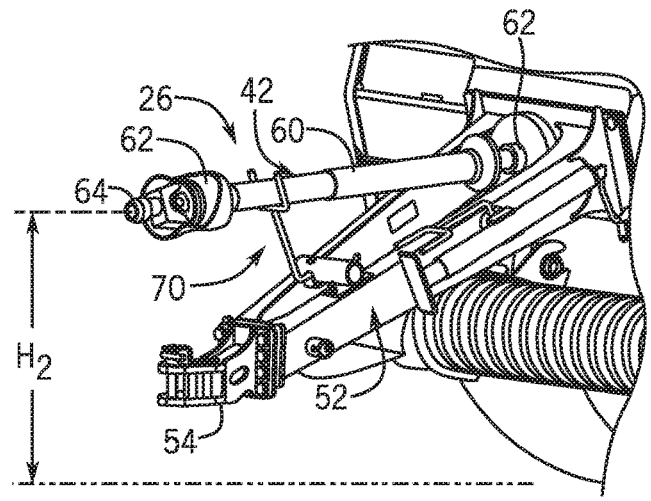
Figure 5C:
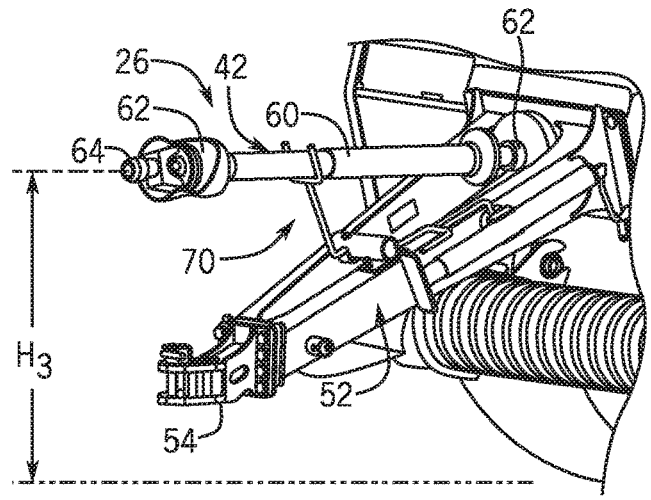

FIGS. 5A-5C illustrate the adjustable mounting of the PTO support 70 to the work implement 12 to facilitate setting or changing the support height. Specifically, the support height may be set or changed by setting or changing the mounting position of the PTO support 70 to the work implement 12. In particular, the channel bracket 76, and thereby the mounting base 72, mounts to the work implement 12 by fitting the flange 58 of one of the tongue braces into the channel 78, sliding the channel bracket 76 to the desired position along the tongue brace, and tightening the threaded fasteners 80 to clamp down against the flange 58. Adjustments may be made simply by loosening and retightening the fasteners 80 after repositioning the channel bracket 76. Further, the disclosed PTO support may allow for tool-less adjustment by using thumb screws or other hand-tightened fasteners.

In each of FIGS. 5A-5C (and also FIGS. 3A and 3B), the PTO shaft 42 is shown at a height corresponding to that needed to couple to the PTO drive shaft 40, and the PTO support 70 is shown in the support orientation at an associated support height to maintain the PTO shaft 42 at its coupled position even after it has been decoupled from the PTO drive shaft 40. Specifically, the power coupling (and support) height is $H_1$-$H_3$ in respective FIGS. 5A-5C, with $H_1$ being the lowest, $H_3$ the highest, and $H_2$ being an intermediate height. It should be noted that these heights are taken with respect to level ground, although they could instead be taken relative to a machine component, such as the hitch device 54.

Again, in various embodiments or applications the disclosed PTO support may differ in construction or operation from the examples described above. To illustrate this, a few example variants will now be described briefly. In one alternate embodiment (not shown) the PTO support may have a similar construction as described above, although to provide for greater lateral movement of the PTO shaft, the cross-piece of the upper "U" section may be elongated so that the upright ends are spaced further apart than shown in the illustrated example.

Other examples of alternate configurations are depicted in FIGS. 7 and 8. Specifically, FIG. 7 shows a PTO support 70a having the same mounting base 72a as described above, however, the post 96a of support member 74a is hinged, via hinge 110, to permit the upper section 90a to pivot relative to the distal end 98a, and thereby the mounting base 72a. Utilizing a self-locking hinge may permit this configuration of the PTO support to convert between support and storage orientations without removing the support member from the mounting base, and thereby allowing for a fixed connection to the mounting base. A spring-biased hinge may also allow the support member 74a to be fixedly mounted, and further to permit the PTO support to generally stay (or be biased) in a support orientation even during operation or transport of the work implement, in which case the spring hinge may accommodate motion-induced movement of the PTO shaft.

FIG. 8 again depicts a PTO support 70b having the same mounting base 72b as described above, however, the support member 74b includes a spring coupler 120 between segments of the post 96b to permit the upper section 90b to flex relative to the distal end 98b, and thereby the mounting base 72b. Like the variant of FIG. 7, the spring coupler 120 may allow the support member 74b to be fixedly mounted and allow the PTO support to generally stay (or be biased) in a support orientation even during operation or transport of the work implement with the spring coupler accommodating motion-induced movement of the PTO shaft.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work implement PTO support assembly, comprising:
   a mounting base having an adjustable connection interface configured to adjustably couple to a tongue of the work implement; and
   a support arm member coupled to the mounting base and having a support interface for contacting a PTO shaft of the work implement when in one of a plurality of support positions;
   wherein, when the support member is in one of the plurality of support positions, the mounting base and the support member are configured to maintain the support interface at an associated one of a plurality of heights; and
   wherein the connection interface defines an open-ended channel and a fastener movable into the channel to provide a clamping force against a flange of the tongue of the work implement received in the channel.

2. The PTO support assembly of claim 1, wherein the connection interface is configured as a slidable clamp connection.

3. The PTO support assembly of claim 1, wherein the support member removably mounts to the mounting base.

4. The PTO support assembly of claim 1, wherein the support member has a post and a cross-piece at an angle to the post; and
   wherein the cross-piece extends in a lateral dimension perpendicular to a fore-aft direction of the work implement and, when the support member is in one of the plurality of support positions, the post extends in an upright dimension perpendicular to the lateral dimension and the fore-aft direction of the work implement.

5. The PTO support assembly of claim 4, wherein the support member has a pair of end members spaced apart laterally along the cross-piece and extending in the upright dimension when the support member is in one of the plurality of support positions.

6. The PTO support assembly of claim 5, wherein the end members are spaced apart laterally greater than a lateral dimension of the PTO shaft.

7. The PTO support assembly of claim 4, wherein the post has an angled distal end extending along a pin axis in the fore-aft direction of the work implement.

8. The PTO support assembly of claim 7, wherein the pin axis forms an angle with respect to a lateral reference plane intersecting the support interface.

9. The PTO support assembly of claim 7, wherein an adjustment feature is interposed between the cross-piece and the distal end and configured to permit the support interface, at least temporarily, to assume a reduced height.

10. The PTO support assembly of claim 9, wherein the adjustment feature is one of a hinge and a spring coupling.

11. The PTO support assembly of claim 1, wherein the support member is removable from the mounting base; and
    wherein the mounting base includes an opening receiving the support member.

12. The PTO support assembly of claim 11, further including an anti-rotation device coupled to at least one of the mounting base and the support member.

13. The PTO support assembly of claim 1, wherein the support member is movable with respect to the mounting base into a storage position without increasing the height of the support interface.

14. The PTO support assembly of claim 13, wherein the storage position is assumed by moving the support member in a direction along a path at an angle with respect to a lateral reference plane intersecting the support interface.

15. A PTO support assembly for a work vehicle train including a work vehicle having a PTO drive shaft and a work implement towed by the work vehicle and having a tongue and a PTO shaft, the PTO support assembly comprising:
    a mounting base having a connection interface coupled to the tongue of the work implement; and
    a support member coupled to the mounting base and having a support interface for contacting the PTO shaft;
    wherein the PTO support is adjustable to a support position in which the support interface is maintained at a height corresponding to a height at which the PTO shaft is engaged with the PTO drive shaft; and
    wherein the connection interface is configured as a slidable clamp having an open-ended channel receiving a flange of the tongue of the work implement and a fastener movable into the channel to provide a clamping force against the flange.

16. The PTO support assembly of claim 15, wherein the mounting base is adjustably coupled to the work implement at the connection interface to permit the support member to assume a plurality of support positions at which the support interface is at a different one of a plurality of heights.

17. The PTO support assembly of claim 15, wherein the support member is movable with respect to the mounting base into a storage position without increasing the height of the support interface.

18. The PTO support assembly of claim 17, wherein the storage position is assumed by moving the support member in a direction along a path at an acute angle with respect to a horizontal reference plane intersecting the support interface.

* * * * *

UNITED STATES PATENT AND TRADEMARK OFFICE
CERTIFICATE OF CORRECTION

PATENT NO. : 10,343,518 B2
APPLICATION NO. : 15/414774
DATED : July 9, 2019
INVENTOR(S) : Kraus Page 1 of 1

It is certified that error appears in the above-identified patent and that said Letters Patent is hereby corrected as shown below:

In the Claims

In Column 11, Claim 1, Line 6, delete "support arm member" and insert -- support member --, therefor.

Signed and Sealed this
Fifth Day of November, 2019

Andrei Iancu
*Director of the United States Patent and Trademark Office*